F. R. OLIVER.
FAUCET.
APPLICATION FILED MAY 29, 1918. RENEWED JULY 29, 1920.
1,370,759.
Patented Mar. 8, 1921.
3 SHEETS—SHEET 1.
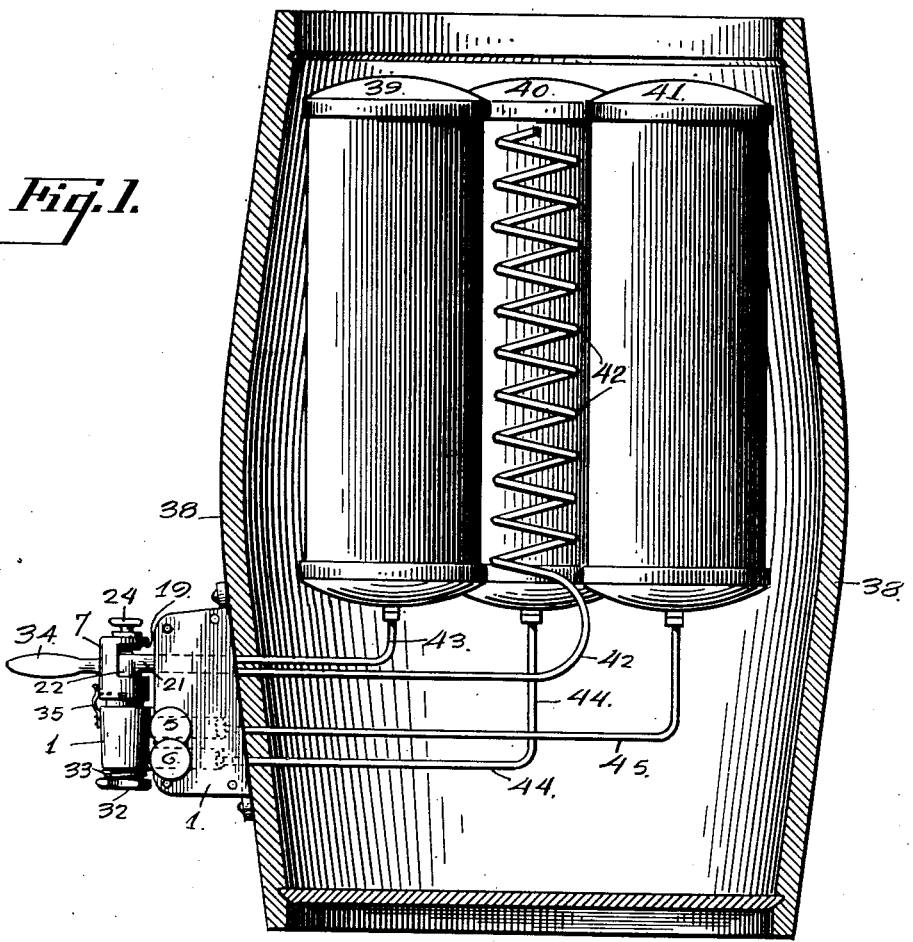
Fig. 1.
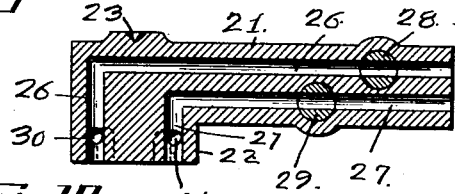
Fig. 9.
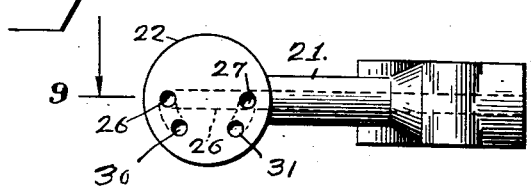
Fig. 10.
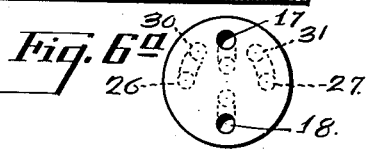
Fig. 6ª.
Fig. 7ª.
Fig. 8ª.
Inventor
Frederick R. Oliver
By Arthur L. Lee
Atty.

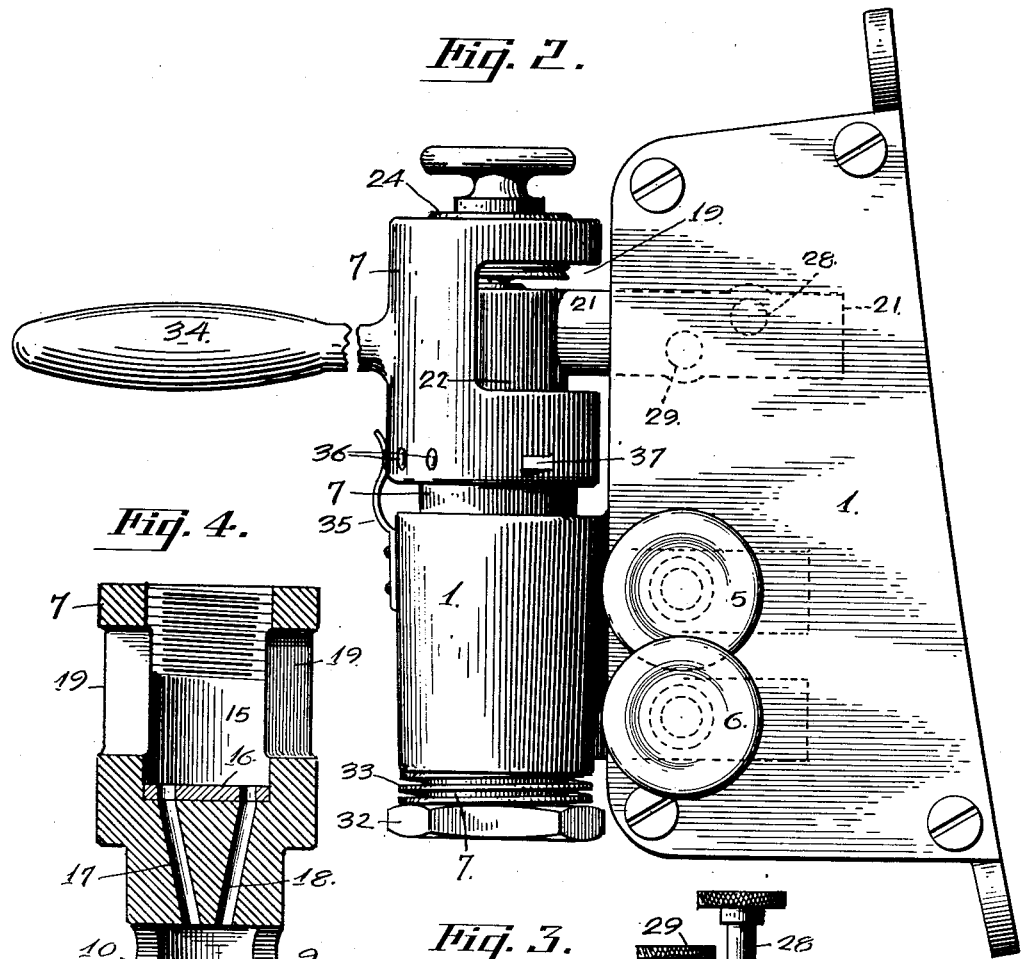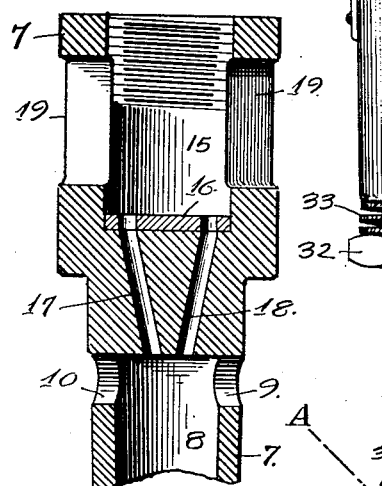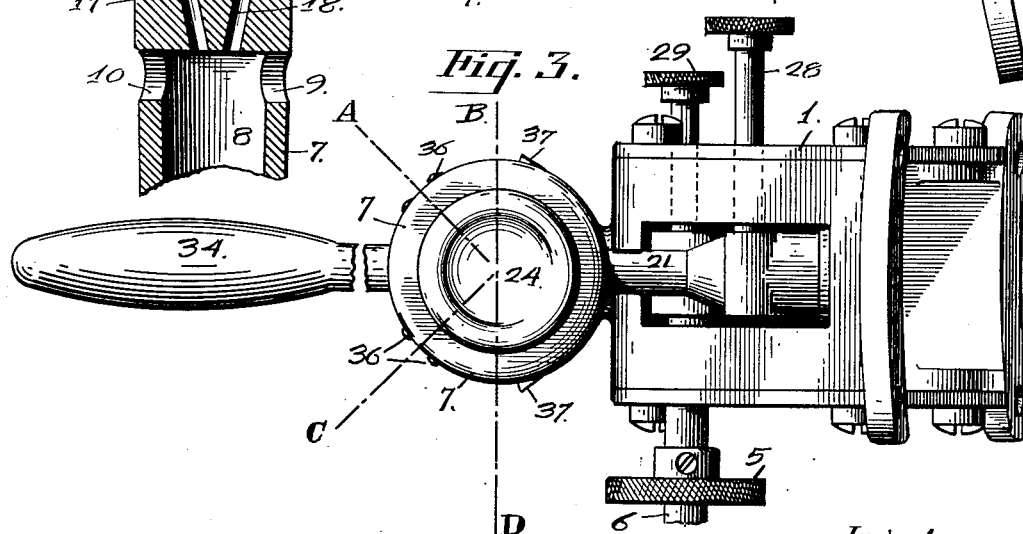

F. R. OLIVER.
FAUCET.
APPLICATION FILED MAY 29, 1918. RENEWED JULY 29, 1920.
1,370,759.
Patented Mar. 8, 1921.
3 SHEETS—SHEET 3.
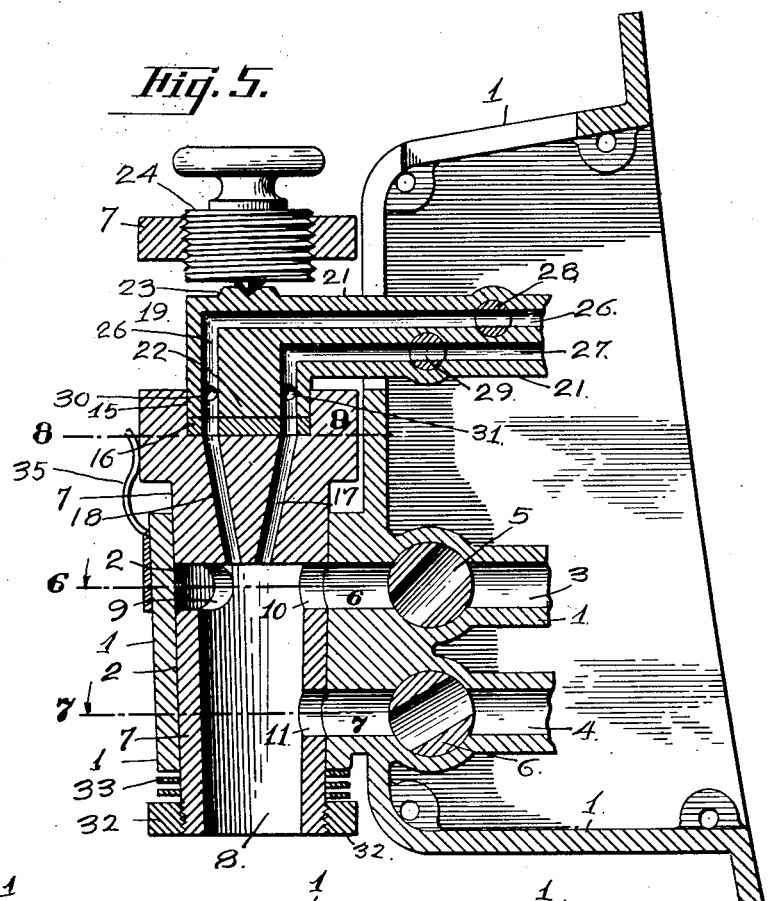
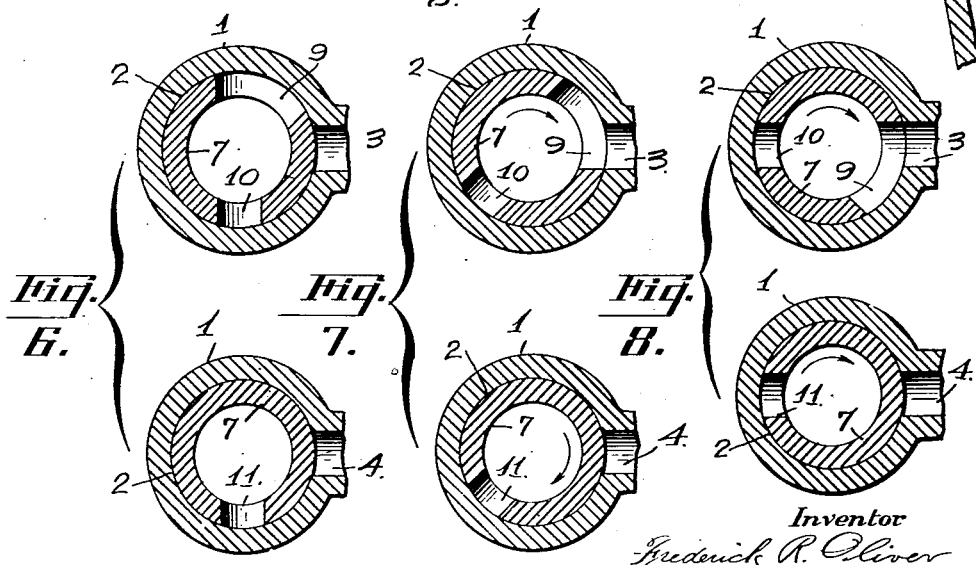
Inventor
Frederick R. Oliver
By Arthur L. Slee.
Atty.

UNITED STATES PATENT OFFICE.

FREDERICK R. OLIVER, OF KANSAS CITY, MISSOURI.

FAUCET.

1,370,759.          Specification of Letters Patent.          Patented Mar. 8, 1921.

Application filed May 29, 1918, Serial No. 237,632. Renewed July 29, 1920. Serial No. 399,885.

*To all whom it may concern:*

Be it known that I, FREDERICK R. OLIVER, a citizen of the United States, residing in the city of Kansas City, county of Jackson, and State of Missouri, have invented a new and useful Improvement in Faucets, of which the following is a specification.

My invention relates to improvements in multi-channeled faucets wherein a channeled cock operates in conjunction with channels in a housing to make various connections and combinations of connections.

The prime object of my invention is to provide an improved faucet adapted to draw and combine various liquids in different or various proportions.

Another object of the invention is to provide means whereby the proportions of the liquids drawn and mixed may be varied.

A further object of the invention is to provide a faucet or cock having a plurality of channels for conveying various liquids and means for connecting various combinations of said channels with an outlet.

A further object is to provide means for independently connecting one or more of the channels with an outlet when operated in one direction and to connect a different combination of channels with the outlet when turned or operated in an opposite direction.

I accomplish these several objects by means of the device disclosed in the drawings forming a part of the present specification wherein like characters of reference are used to designate similar parts throughout the said specification and drawings and in which—

Figure 1 is a vertical sectional view of a barrel or other suitable housing having a plurality of containers therein connected to my improved faucet;

Fig. 2 is an enlarged side elevation of my improved faucet removed from the container;

Fig. 3 is a plan view of Fig. 2;

Fig. 4 is a broken vertical section of the cock portion of the faucet taken on a plane at right angles to the cock shown in Fig. 2;

Fig. 5 is a vertical sectional view of the device with the cock turned to open all of the channels;

Figs. 6, 7 and 8 are horizontal sectional views taken through lines 6—6 and 7—7 of Fig. 5 but disclosing various positions of the cock;

Figs. 6ª, 7ª, and 8ª are diagrammatic views disclosing corresponding positions of another portion of the cock indicated on line 8—8 of Fig. 5;

Fig. 9 is a vertical sectional view taken on line 9—9 of Fig. 10;

Fig. 10 is a bottom plan view of the piece disclosed in Fig. 9.

Referring to the drawings the numeral 1 is used to designate a double-channeled housing having a vertically disposed tapering bore 2 therein and upper and lower channels 3 and 4 controlled by cocks 5 and 6 respectively.

A double-channeled taper cock 7 is rotatably mounted within the tapered bore 2 of the housing 1 and is provided with a lower hollow open end 8 provided with diametrically opposed apertures 9 and 10 arranged to register with the channel 3 and a lower aperture 11 arranged below the aperture 10 and arranged to register with the lower channel 4 simultaneously with the registration of said aperture 10 with the upper channel 3. The aperture 9 includes a greater arc upon the periphery of the cock 7 than the apertures 10 and 11 so that said aperture will register with the upper channel 3 when the cock 7 is turned through a one-quarter arc, while the apertures 10 and 11 will not register with their respective channels 3 and 4 until said cock 7 has been turned from normal or closed position through an arc of 90 degrees or a right angle, the purpose of which arrangement will hereinafter be more fully set forth.

The upper portion of the cock 7 is provided with a bore 15 having a washer 16 in the bottom thereof and two channels 17 and 18 leading from the said bore 15 to the open hollow end 8 of the cock 7.

The bore 15 is open on one side as at 19 for the introduction of a double-channeled member 21 having a cylindrical lateral or depending extension 22 provided with a face to seat upon the washer 16 within the bore 15 and a socket 23 to receive the pointed end of a nut 24 screwed within the upper portion of the bore 15. The nut 24 is provided to insure contact of the face of the extension 22 with the washer 16 in the bore 15 through which washer 16 the channels 17 and 18 extend.

The double channeled member 21 is provided with two channels 26 and 27 regulated and controlled by cocks 28 and 29 respectively which emerge through the face of the extension 22 and are provided with by-pass extensions 30 and 31 respectively, the purpose of which will hereinafter be more fully described.

The cock 7 is normally seated within the tapered bore 2 of the housing 1 by means of a nut 32 screwed onto the lower end of said cock 7 and a spring 33 interposed to turn the cock 7.

The various operating and normal positions of the cock 7 relatively to the various channels within the housing 1 and channeled member 21 are indicated by means of a spring 35 secured upon the housing 1 and projections 36 and stops 37. The rounded projections 36 are provided to engage each side of the spring 35 but not to arrest or prevent the passage of said spring 35 when the cock 7 is rotated but the stops 37 are provided to prevent further rotation of said cock 7 and represent extreme positions of said cock 7.

The housing 1 is detachably mounted upon a barrel 38 or other suitable receptacle adapted to contain ice or other suitable refrigerant. Within the barrel 38 are containers 39, 40, 41 and a coil pipe 42.

The container 39 is connected by means of a suitable pipe 43 with the upper channel 26 within the channeled member 21 while the pipe coil 42 is connected with the lower channel 27 within the same member 21, and is designed to convey, in the present instance, water under pressure.

The container 40, designed to contain a concentrated syrup, is connected by means of a pipe 44 to the lower channel 4 in the housing 1 while the container 41, designed to contain water to be fed by gravity is connected by means of a pipe 45 to the upper channel 3 of the housing 1.

While not limited to the specified use, the present invention is intended to be used in connection with migratory entertainments where the dispensing of liquid refreshments is no small part of the entertainment.

In the present instance the containers 39 and 40 are filled with a carbonated water and concentrated syrup respectively. A concentrated syrup is used to facilitate transportation as it is more convenient to dilute said syrup with water than to transport the diluted or normal syrup from place to place.

If city water pressure is available a connection is made with the coil pipe 42 and ice or other suitable refrigerant is placed within the barrel 38 which barrel serves as an ornamental dispensing fountain.

If no water pressure supply is obtainable water is placed within the container 41 and flows by gravity through the pipe 45 and the upper channel 3.

It should be noted that the pressure water supply as embodied in the pipe coil 42 flows to the smaller lower channel 27 within the double-channeled member 21 while the pipe 45 from the gravity water container 41 is connected to the larger upper channel 3 of the housing 1.

The reason for this arrangement is that it is desired to automatically mix the proper amount of water with the other liquids to form the proper beverage. The city water pressure through the smaller channel 26 will deliver the same amount of water in the same time required for the lesser gravity pressure to flow through the larger channel 3 in the housing 1, and should the city pressure vary at various locations the amount of water delivered through the channel 26 may be regulated and controlled by the cock 28 while the proper gravity flow may be controlled through the cock 5 of the channel 3.

In operation the faucet is adapted to draw a glass of plain water, a glass of carbonated water, or the beverage in proper proportions according to the request or desire of the consumer. Or should the consumer request that the beverage be "not too sweet" a greater amount of water or carbonated water may be drawn into the glass before the cock is turned to a position to deliver the beverage.

Normally the cock 7 is closed and the relative position of the apertures, channels and cock 7 will be as illustrated in Figs. 1, 2, 3, 6, and 6ª of the drawings. The Figs. 6ª. 7ª and 8ª are diagrammatic and represent a plan view of the channels 17, 18, in the cock 7 and the outlets of the channels 26 and 27 with their respective by-pass connections 30 and 31, respectively, within the double-channeled member 21 indicated in dotted lines in the position seen could the observer look through the lateral or cylindrical extension 22 of the member 21 from the top to the bottom thereof.

Therefore when the cock 7 is closed the relative positions of all of the channels and apertures will be as disclosed in Figs. 6 and 6ª.

To draw a glass of water the handle 34 is only partially turned or to the position indicated by the dotted line A in Fig. 3 of the drawings. By referring to the upper portion of Fig. 7 it will be seen that the longer aperture 9 will intercept or register with the water channel 3 in the housing 1 and the channel 17 will register with the by-pass 31 of the outlet to the water pressure connection 27 within the member 21 so that a glass of water only will always be drawn when the handle 34 is in this position whether city water pressure through the coil 42 or gravity from the container 41 is used. In other words, a glass of plain water only will be drawn when the cock 7 is partially rotated in one direction or to a position where the spring 37 will rest between the projections 36 on either side of the line A in Fig. 3 of the drawings.

To obtain a mixture of carbonated water and plain drinking water the handle 34 is turned to its extreme position in the same direction or to the position B which will move the channel 18 under the carbonated water channel 26 of the member 21 and the elongated aperture 9 will still be in registration with the channel 3 of the housing 1 while the channel 17 will move from the by-pass 31 of the channel 27 to said channel 27 as disclosed in Figs. 8 and 8ª of the drawings. Reference to these two Figs. 8 and 8ª will disclose that the aperture 11 has been moved away or diametrically opposite to the syrup channel 4.

When the handle 34 is turned partially in the opposite direction or to the position of the dotted line C in Fig. 3 of the drawings so that the spring 35 on the housing 1 will rest between the first two projections 36 on the side then the channel 17 will be moved into registration with the by-pass 30 of the carbonated water channel 26 and a glass of carbonated water only will be drawn.

By moving the handle 34 to the extreme position in the same direction until the stop 37 on that side of the cock 7 impinges against the spring 35, or to the position indicated by the dotted line D in Fig. 3 of the drawings, then the channels 17 and 18 of the cock 7 will register with the channels 26 and 27 respectively to admit carbonated water and plain water, if city pressure is being used, and the apertures 10 and 11 will register with the gravity water channel 3 and the syrup channel 4 in the housing 1 as disclosed in Fig. 5 of the drawings.

Reference to this figure will indicate that the water and carbonated water will be delivered above the syrup and will therefore assist in forcing the said syrup into the glass not shown, thereby facilitating the mixture of the various combinations to produce the desired beverage.

It is obvious that the amount or quantity of the various liquids drawn may be regulated by the valves or cocks 5, 6, 28, and 29 so that various combinations of liquids may be drawn in various combinations and in varying proportions as well.

Having thus described my invention what I claim as new and desire to secure by Letters Patent is—

1. A faucet comprising a double channeled housing; a double channeled member arranged adjacent the housing; and a cock rotatably mounted within the housing and operatively connected to the channeled member and having open channels arranged to register with one of the channels in the housing and one of the channels in the channeled member only when turned to one position and to register the cock channels with all of the channels in the housing and channeled member when turned in the opposite direction.

2. A faucet comprising a double channeled housing; a double channeled member arranged adjacent the housing; and a cock rotatably mounted within the housing and operatively connected to the channeled member and having open channels arranged to register with one channel only in the channeled member and one channel only in the housing when partially turned in one direction, and to register said cock channels with all channels in the member and one channel only in the housing when turned farther in the same direction, and to register said cock channels with all of the channels in the channeled member and in the housing when fully turned in the opposite direction.

3. A faucet comprising a double-channeled housing, a double-channeled member arranged adjacent the housing; a cock rotatably mounted within the housing and operatively connected to the channeled member and having open channels arranged to register with one channel only in the channeled member and the housing when partially turned in one direction, and to register said cock channels with all of the channels in the member and one channel only in the housing when turned farther in the same direction, to register one of said cock channels with one channel in the channeled member when partially turned in the opposite direction and to register all of the cock channels with all of the channels in the member and the housing when turned farther in the same direction.

4. All of claim 3, and then add: and means for controlling and regulating the passage of liquid through the channels in the member and the housing whereby various combinations of various liquids in varying proportions may be drawn.

5. A faucet comprising a housing having a bore therein and upper and lower channels opening into said bore; a double-channeled member arranged adjacent the housing; and a cock rotatably mounted within the bore in the housing and operatively connected to the channeled member said cock having a hollow open lower end provided with diametrically opposed apertures arranged to register with the upper channel in the housing and an aperture arranged below, one of the first mentioned apertures, and channels leading from said hollow end to the end of the channeled member, whereby various combinations of connections may be made between the hollow open end of the cock and the channels in the housing when said cock is turned to various positions.

6. All of claim 5, and then add: and means for controlling and regulating the passage of liquid through the channel in the housing and channeled member whereby various combination of various liquids in varying proportions may be drawn.

In witness whereof I hereunto set my signature.

FREDERICK R. OLIVER.